United States Patent [19]

Edinger et al.

[11] 4,391,764

[45] Jul. 5, 1983

[54] METHOD OF MANUFACTURE OF IDENTICAL PARTS DISPLAYING DIFFERENT INDICIA

[75] Inventors: Egon Edinger, Graefelfing; Gerd Kohler, Munich, both of Fed. Rep. of Germany

[73] Assignee: Siemens Aktiengesellschaft, Berlin & Munich, Fed. Rep. of Germany

[21] Appl. No.: 311,875

[22] Filed: Oct. 15, 1981

[30] Foreign Application Priority Data

Nov. 27, 1980 [DE] Fed. Rep. of Germany ....... 3044722

[51] Int. Cl.³ .............................................. B41M 5/26
[52] U.S. Cl. .................................. 264/25; 219/121 L; 219/121 LM; 264/51; 264/132; 264/328.18; 425/174.4
[58] Field of Search ............. 264/22, 25, 132, 328.18, 264/51; 219/121 LM, 121 L, 121 LB; 425/174.4

[56] References Cited

U.S. PATENT DOCUMENTS

| | | | |
|---|---|---|---|
| 3,266,393 | 8/1966 | Chitayat | 219/121 L |
| 3,443,936 | 5/1969 | Menold | 264/22 |
| 3,506,779 | 4/1970 | Brown et al. | 219/121 LB |
| 3,549,733 | 12/1970 | Caddell | 264/25 |
| 3,651,191 | 3/1972 | Glatt et al. | 264/132 |
| 3,657,510 | 4/1972 | Rothrock | 219/121 LA |
| 3,678,141 | 7/1972 | Metcalfe et al. | 264/73 |
| 4,013,747 | 3/1977 | Hampel | 264/73 |
| 4,037,075 | 7/1977 | Pugsley et al. | 219/121 LM |
| 4,064,205 | 12/1977 | Landsman | 264/22 |
| 4,159,414 | 6/1979 | Suh et al. | 219/121 LM |
| 4,277,669 | 7/1981 | Alfano et al. | 219/121 L |
| 4,307,047 | 12/1981 | Edinger et al. | 264/25 |

FOREIGN PATENT DOCUMENTS

| | | |
|---|---|---|
| 2115548 | 10/1972 | Fed. Rep. of Germany ........ 264/25 |
| 2240553 | 9/1978 | Fed. Rep. of Germany . |
| 2936926 | 4/1981 | Fed. Rep. of Germany ........ 264/22 |

*Primary Examiner*—Jeffery R. Thurlow
*Attorney, Agent, or Firm*—Hill, Van Santen, Steadman, Chiara & Simpson

[57] ABSTRACT

A method of manufacturing plastic parts which are otherwise identical but which display different indicia such as typewriter keys which comprises the steps of injection molding a plurality of identical parts of a plastic having a filler material capable of undergoing a color change and thereafter exposing individually the identical parts to a radiation source for changing the color of localized portions of the part to display the indicia while retaining the molded color of remaining portions wherein the plastic is polyacetal and the filler is carbon black or graphite.

8 Claims, No Drawings

METHOD OF MANUFACTURE OF IDENTICAL PARTS DISPLAYING DIFFERENT INDICIA

BACKGROUND OF THE INVENTION

1. Field of the Invention

This invention relates to methods of production, and more particularly, to methods for producing a plurality of similar plastic parts by injection molding and thereafter providing different readable indicia on or within the plastic parts.

2. Prior Art

In a prior U.S. patent application, Ser. No. 179,040, allowed June 18, 1981, now U.S. Pat. No. 4,307,047 the teachings of which are incorporated herein by reference, a method of manufacture of identical parts displaying different indicia is disclosed. In that method, the parts are injection molded out of a base material plastic to which a filler has been added. The plastic in the base material of the part is mixed with a filler which is capable of being changed in color by means of applied energy radiation. Subsequent to mixture of the plastic-filler mixture, the uniform parts are injection molded through the use of a uniform tool such that identically shaped parts are provided. Thereafter, the standard parts are subjected to an energy radiation which is accomodated to the shape of the symbol which is to be applied thereby correspondingly changing the color of the surface of the part at the location of impact by the energy radiation.

In the prior disclosed method, a preferred base plastic was ABS whereas the filler was a color powder which responded to thermal radiation such as, for example, that available from Farber Castell under the trademark "Thermocolor". The applied energy radiation was preferably by means of deflectable laser played over the surface of the part.

In this manner, plastic keys could be manufactured whose indicia was a fixed part of the base material as opposed to an applied part common with printed keys. Thus, the product, although initially identically produced in volume, was, after creation of the readable indicia, substantially corresponding to the quality standard previously had in two-color injection molded plastic keys.

SUMMARY OF THE INVENTION

It is the principal object of this invention to improve the prior production method while making it more economical.

This principal object is achieved by utilizing carbon black or graphite respectively as the filling material admixed to the plastic. Preferably, the plastic utilized is polyacetal (POM) with the carbon black or graphite added prior to molding as a filling material.

It is therefore an object of this invention to provide an improved method of manufacture of similarly shaped items with differing indicia.

It is another, and more specific object of this invention to provide a method of manufacturing identically shaped items having differed indicia thereon by molding the items out of a plastic having a carbon black or graphite filler admixed thereto prior to molding, and to thereafter form the readable indicia by application of thermal energy to convert selected areas of the carbon black filler by combustion to create color differences within the item, the areas of color difference corresponding to the desired indicia.

Other objects, features and advantages of the invention will be readily apparent from the following description of preferred embodiments thereof, taken in conjunction with the accompanying drawings, although variations and modifications may be effected without departing from the spirit and scope of the novel concepts of the disclosure, and in which:

DESCRIPTION OF THE PREFERRED EMBODIMENTS

A standard shaped injection molded key, such as a typewriter key, is formed of a base plastic material, preferably polyacetal (POM) having a filler of carbon black or graphite admixed thereto. In manufacture, standard injection molding procedures are followed and a key or other item having a top surface otherwise undistinguished by indicia is produced. Thereafter, the surface upon which the indicia is to be displayed is subjected to an energy source such as, for example, a deflectable laser beam emminating from a laser inscription system. Laser systems capable of controlled movement of the laser beam are known to the art and include laser beam generating equipment and associated deflection systems. In such systems, a program memory releases signals corresponding to the desired symbol to be displayed by the part to a control which correspondingly influences a deflector system for the laser. The laser beam, when applied to the molded item, causes the filler material in the area of the applied laser energy to react in a manner which causes a color differentiation within the material of the molded item.

While the deflectable laser is a preferred termal energy source, other similar thermal energy sources may be utilized such as, for example, an electron beam or x-ray beam.

Additionally, in place of a deflectable laser beam, a fixed laser beam can be utilized where the molded item is moved in reference to the fixed beam.

Carbon black or graphite respectively have historically been employed within the plastics industry for the purpose of dying plastics black. By means of application of energy rich radiation such as by means of a laser, carbon black or graphite within the plastic molded item can be caused to transform. The transformation is brought about by means of a combustion of the carbon black or graphite which forms $CO_2$ which escapes from the item. As a result of the combustion, a foam-like melt zone will be created in the shape of the character or other indicia desired. Within the melt zone, substantially no carbon black particles will remain. In this manner a natural plastic color character will result on a black background, the black background being the uncombusted area of the molded item, the natural colored character or indicia being the combusted area. Due to refraction of light on the small foam bubbles formed in the foam-like melt zone, the contrast with the black background is increased.

A requirement for completion of the above described reaction is that the laser must initially thermally penetrate into the depth of the molded article from the surface thereof because otherwise the application of thermal energy would burn away or otherwise remove particles of the surface. This requirement is met by use of a natural colored opaque or transparent thermal plastic which is colored with a pigment concentration adjusted such that the laser is sufficiently strongly absorbed only at a desired depth (approximately 0.1 mm) that the melt and gasification operation will be satisfactorily completed. It has been found that a pigment concentration between 0.08 to 0.125 percent carbon black (99.875 to 99.92 percent by weight POM natural) provides a good indicia forming capability.

By use of such a formula, conversion or melt and gasification occur to a depth of 0.1 to 0.15 mm. Higher carbon black concentrations are possible if the transparency necessary for the laser inscription is enhanced by admixture of chalk or similar transparent crystalline materials and other filling materials.

A further improvement of the whiteness or color differenciation of the indicia can be achieved by addition of optical brighteners or bleaches. It has been found that an optical brightener sold under the trademark "Uvitex OB" by Ciba Geigy is acceptable. Such optical brighteners are admixed to the pigments and added to the plastic as part of the filler. It has been found that such optical brighteners will not be destroyed by the laser action.

An additional advantage to this method in comparison to two-color injection molding is that a very thin wear resistent indicia having a depth of approximately 0.1 mm can be produced.

A significant advantage of the method of this invention resides in the fact that a known filling material, namely carbon black or graphite, is utilized and that the most frequently employed color differentiation combination, i.e. white on black background results. Thus, an acceptable product can be produced utilizing known quality, readily available materials.

A further advantage of practicing the present invention resides in the ability to achieve a satisfactory product without extreme control of the laser application process. This results from the fact that the method changes the color from the black background to a white or whiteish color. With an increasing change from the black towards the white or neutral color by application of the laser, absorption of the laser beam within the molded article will decrease. In this manner, should an initially overpowered laser beam be applied, a self-regulating process automatically forms in which excess laser energy is radiated from the item through reflection from the forming indicia.

Moreover, since the invention is preferably utilized in the manufacture of mass produced items such as typewriter keys and the like, and since carbon black or graphite respectively are normally considerably cheaper than prior used thermal radiation indicator materials, the invention of this method is considerably more economical than the prior art.

It can therefore be seen from the above that our invention provides an improved method of manufacture of identically shaped molded plastic items displaying different indicia, the items being formed of POM plastic to which a small quantity of carbon black or graphite is added as a filler prior to molding. Subsequent to molding a thermal energy beam, such as a laser, is applied to selected portions of the molded article to cause the carbon black or graphite to undergo combustion converting surface adjacent portions of the molded plastic item to a contrasting color from the remaining portions of the molded plastic item. Preferably the POM plastic is utilized in its neutral color state and the added filler material, i.e. carbon black or graphite, is applied in concentrations of less than one percent. Additional color differentiation enhancing materials such as, for example, optical brighteners, can be added to the filler material before admixture to the plastic.

We claim:

1. In the method of producing identically shaped plastic keys having different readable indicia on a surface thereof which comprises the steps of preparing a mixture of a base plastic material and a filler material, molding the keys by injection molding with at least a surface portion of the key formed of the mixture, providing a laser beam, focusing the energy radiation in the beam, moving the key surface and beam with respect to one another in a predetermined pattern whereby the beam plays over the surface in a path corresponding to the desired readable indicia, the improvement of the filler material being selected from one of the group of carbon black and graphite, the beam having sufficient power to combust at least a portion of the filler material within the plastic key adjacent the surface without substantial combustion of the base material adjacent the combusted filler material.

2. A method according to claim 1 wherein the base plastic is polyacetal.

3. A method according to claim 2 wherein between 0.08 and 0.125 percent by weight carbon black is added as the filler.

4. A method according to claim 1 wherein an optical brightener which is non-destructable by the laser beam is added to the filler material.

5. A method according to claim 2 wherein an optical brightener which is non-destructable by the laser beam is added to the filler material.

6. A method according to claim 3 wherein an optical brightener which is non-destructable by the laser beam is added to the filler material.

7. A method according to claim 1 wherein between 0.08 and 0.125 percent by weight carbon black is added as the filler.

8. A method according to claim 1 wherein the laser beam penetrates to a depth of approximately 0.1 mm below the surface of the key.

* * * * *